(12) United States Patent
De Keyzer et al.

(10) Patent No.: US 10,596,744 B2
(45) Date of Patent: Mar. 24, 2020

(54) METHOD FOR WELDING A HEAT SHIELD DURING MANUFACTURING OF A VEHICLE COMPONENT

(71) Applicant: Plastic Omnium Advanced Innovation and Research, Brussels (BE)

(72) Inventors: Pierre De Keyzer, Brussels (BE); Laurent Duez, Uccle (BE); Bjorn Criel, Sint-Martens-Lennik (BE); Jules-Joseph Van Schaftingen, Wavre (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 155 days.

(21) Appl. No.: 15/514,698

(22) PCT Filed: Sep. 29, 2015

(86) PCT No.: PCT/EP2015/072471
§ 371 (c)(1),
(2) Date: Mar. 27, 2017

(87) PCT Pub. No.: WO2016/050794
PCT Pub. Date: Apr. 7, 2016

(65) Prior Publication Data
US 2017/0217075 A1    Aug. 3, 2017

(30) Foreign Application Priority Data
Sep. 29, 2014   (EP) .................................... 14186920

(51) Int. Cl.
*B29C 49/20* (2006.01)
*B60K 15/03* (2006.01)
(Continued)

(52) U.S. Cl.
CPC .............. *B29C 49/20* (2013.01); *B29C 49/04* (2013.01); *B60K 15/03177* (2013.01);
(Continued)

(58) Field of Classification Search
CPC .... B29C 2049/2017; B29C 2049/2065; B29C 2049/2069; B29C 2049/2095;
(Continued)

(56) References Cited

U.S. PATENT DOCUMENTS

| 5,020,687 A | 6/1991 | Seizert |
| 5,188,981 A * | 2/1993 | Stiles ........................ B32B 5/18 |
| | | 428/309.9 |

(Continued)

FOREIGN PATENT DOCUMENTS

| CN | 103443342 A | 12/2013 |
| DE | 102010017714 A1 | 1/2012 |

(Continued)

OTHER PUBLICATIONS

International Search Report dated Dec. 10, 2015, in PCT/EP2015/072471, filed Sep. 29, 2015.
(Continued)

*Primary Examiner* — Benjamin A Schiffman
(74) *Attorney, Agent, or Firm* — Oblon, McClelland, Maier & Neustadt, L.L.P.

(57) ABSTRACT

A method for welding a heat shield during manufacturing of a vehicle component made from a thermoplastic material. The heat shield includes: a reinforcement layer made from a thermoplastic material which is weldable to the thermoplastic material of the vehicle component; and a heat shielding material that differs from the thermoplastic material of the reinforcement layer and is configured to decrease transfer of heat through the reinforcement layer to the vehicle component. The method includes: heating the heat shield to bring the thermoplastic material of the reinforcement layer in a molten state; placing the heated heat shield in a mold; bringing into the mold the thermoplastic material of the vehicle component in a molten state; welding the thermoplastic material of the reinforcement layer being in a molten state to the thermoplastic material of the vehicle component being in a molten state, by blow molding the vehicle component in the mold.

12 Claims, 4 Drawing Sheets

(51) Int. Cl.
  *B29C 49/04*   (2006.01)
  *B29L 31/00*   (2006.01)
  *B32B 5/02*    (2006.01)
  *B32B 5/18*    (2006.01)
  *B32B 7/12*    (2006.01)
  *B32B 15/14*   (2006.01)
  *B32B 15/20*   (2006.01)
  *B32B 27/06*   (2006.01)
  *B32B 27/32*   (2006.01)

(52) U.S. Cl.
  CPC ............ *B29C 2049/2017* (2013.01); *B29C 2049/2021* (2013.01); *B29C 2049/2065* (2013.01); *B29C 2049/2086* (2013.01); *B29C 2049/2095* (2013.01); *B29K 2995/0015* (2013.01); *B29K 2995/0077* (2013.01); *B29L 2031/7172* (2013.01); *B32B 5/02* (2013.01); *B32B 5/18* (2013.01); *B32B 7/12* (2013.01); *B32B 15/14* (2013.01); *B32B 15/20* (2013.01); *B32B 27/065* (2013.01); *B32B 27/32* (2013.01); *B32B 2307/304* (2013.01); *B32B 2307/54* (2013.01); *B32B 2605/00* (2013.01); *B60K 2015/03039* (2013.01); *B60K 2015/03046* (2013.01); *B60K 2015/03421* (2013.01)

(58) Field of Classification Search
  CPC ........... B29C 2049/2477; B29C 49/20; B29C 2049/2004–2095
  See application file for complete search history.

(56) References Cited

U.S. PATENT DOCUMENTS

| | | | | |
|---|---|---|---|---|
| 6,071,370 A | * | 6/2000 | Stiles | ............ B29C 49/20 156/244.13 |
| 6,268,037 B1 | * | 7/2001 | Butler | ............ B29C 49/20 220/560.13 |
| 6,401,961 B1 | * | 6/2002 | Butler | ............ B29C 49/20 220/560.01 |
| 6,661,339 B2 | * | 12/2003 | Muirhead | ............ B29C 51/267 220/562 |
| 9,375,870 B2 | * | 6/2016 | Ohtsuka | ............ B29C 49/20 |
| 2007/0203300 A1 | * | 8/2007 | Sumi | ............ C08L 53/00 525/240 |
| 2008/0169678 A1 | * | 7/2008 | Ishida | ............ B29C 49/2408 296/191 |
| 2011/0037203 A1 | | 2/2011 | Gotsu | |
| 2011/0240389 A1 | | 10/2011 | Niewoehner et al. | |
| 2013/0037549 A1 | | 2/2013 | Martin et al. | |
| 2014/0050886 A1 | | 2/2014 | Burgin et al. | |
| 2014/0212655 A1 | | 7/2014 | Matsuno et al. | |
| 2014/0326732 A1 | | 11/2014 | Huetzen et al. | |
| 2016/0052386 A1 | | 2/2016 | De Keyzer et al. | |
| 2016/0159501 A1 | * | 6/2016 | Kusaba | ............ B64G 1/58 428/304.4 |

FOREIGN PATENT DOCUMENTS

| | | |
|---|---|---|
| FR | 2957296 A1 | 9/2011 |
| JP | 2009-67223 A | 4/2009 |
| WO | 2007/000454 A1 | 1/2007 |
| WO | 2011/110480 A1 | 9/2011 |
| WO | 2013/041180 A2 | 3/2013 |
| WO | 2013/047771 A1 | 4/2013 |
| WO | 2014/154900 A1 | 10/2014 |

OTHER PUBLICATIONS

European Search Report dated Jan. 22, 2015, in EP 14 18 6920, filed Sep. 29, 2014.

* cited by examiner

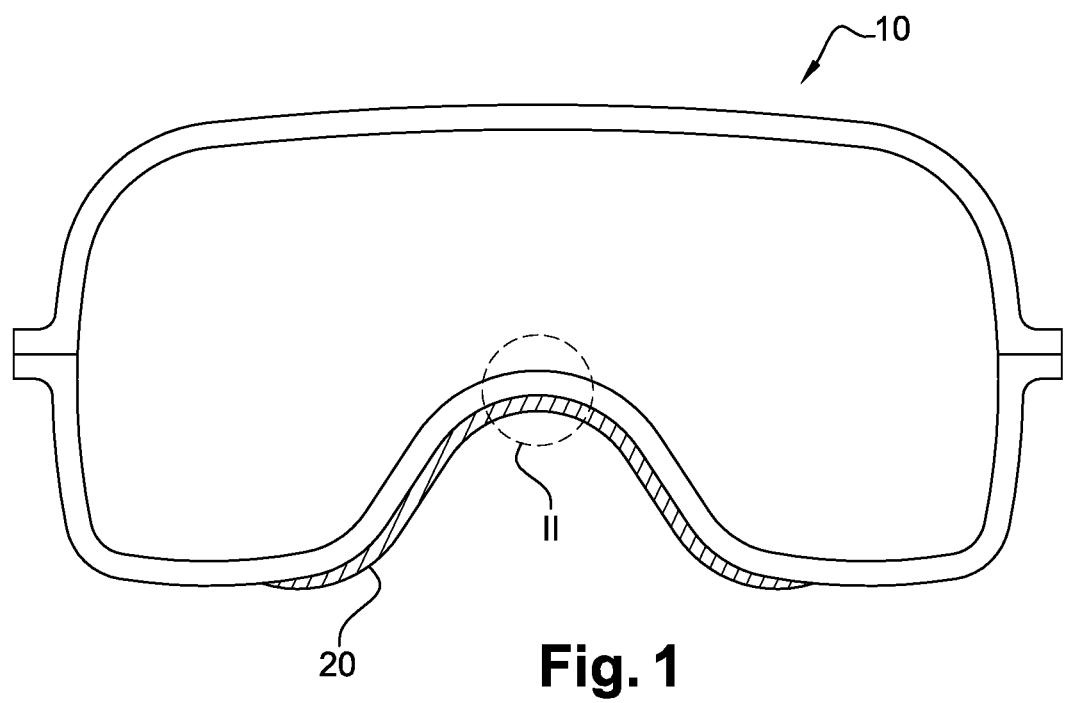
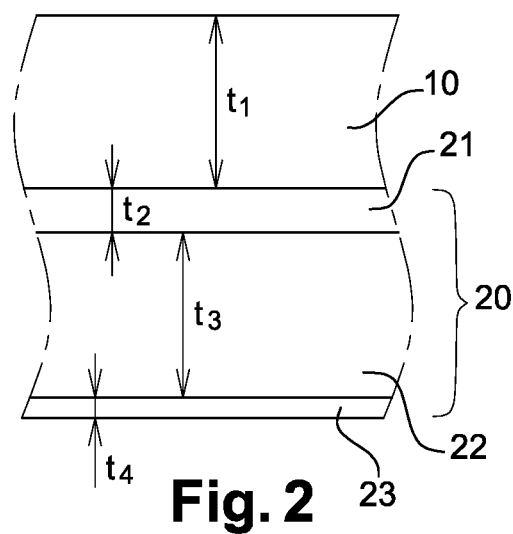 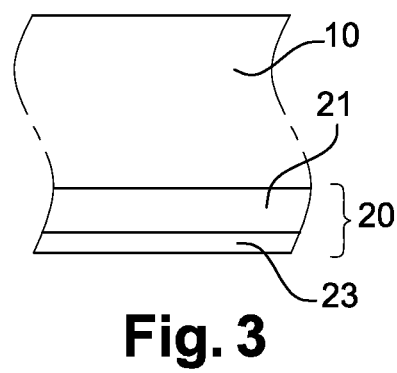

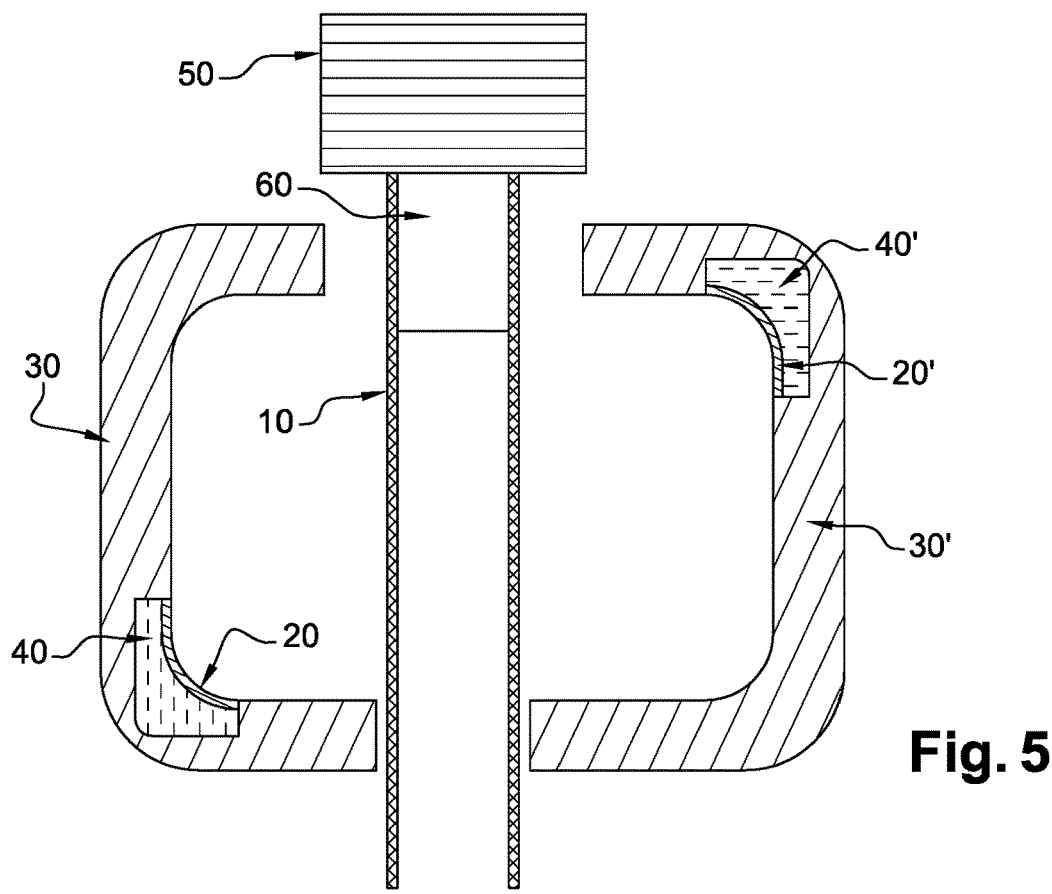
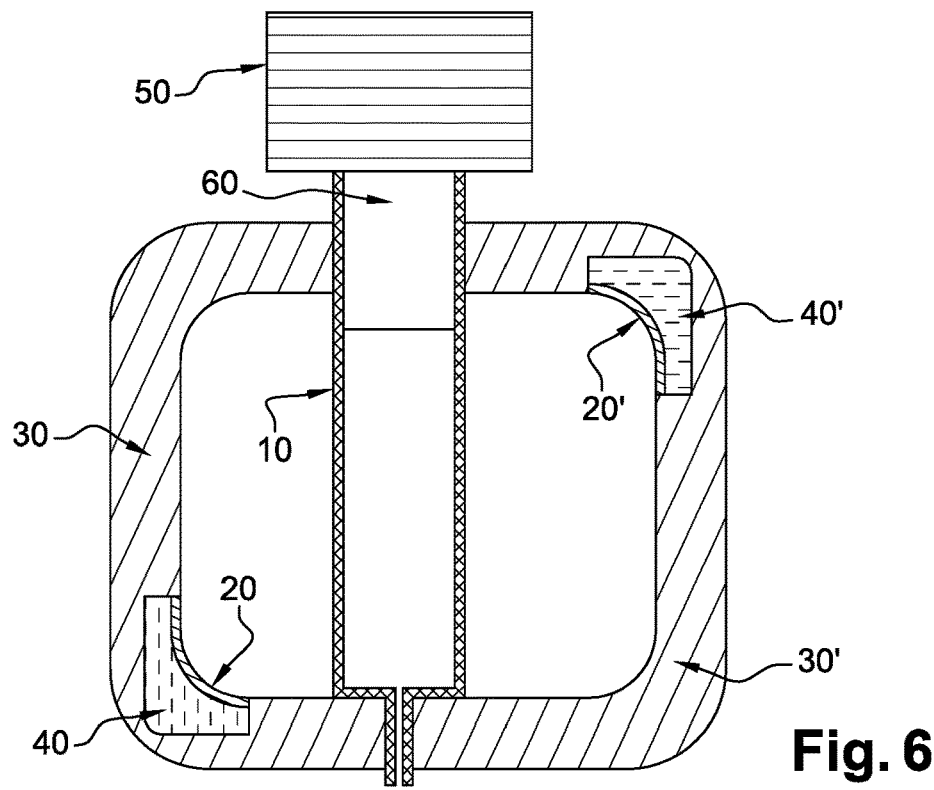

METHOD FOR WELDING A HEAT SHIELD DURING MANUFACTURING OF A VEHICLE COMPONENT

FIELD OF THE INVENTION

The invention relates to a method for welding a heat shield during manufacturing of a vehicle component made from a thermoplastic material, in particular a vehicle tank or a filler pipe. The invention also relates to a method for manufacturing such a vehicle component.

BACKGROUND

A prior art vehicle component may be provided with a heat shield for blocking and/or reducing the transfer of heat to the vehicle component. For example, there exist heat shields in metal, which are fixed on or near the wall of a vehicle tank using e.g. clips or adhesive. Such heat shields are used to reduce the amount of heat that is transferred to the vehicle tank, e.g. heat from a hot element such as an exhaust pipe, which is arranged near the vehicle tank.

Such metal shields are dangerous to handle in view of the risk on cuts when manipulating such heat shields. Further, when a heat shield is fixed using clips, noise may occur due to vibrations of the heat shield. Also, adhesive heat shields may peel off after aging.

SUMMARY

The object of embodiments of the invention is to provide a method for welding a heat shield during manufacturing of a vehicle component. A further object is to provide an improved method for manufacturing such a vehicle component.

According to a first aspect of the invention there is provided a method for welding a heat shield during manufacturing of a vehicle component made from a thermoplastic material. The heat shield comprises a reinforcement layer made from a thermoplastic material which is weldable to the thermoplastic material of the vehicle component; and a heat shielding material which differs from said thermoplastic material of said reinforcement layer and which is configured for decreasing the transfer of heat through the reinforcement layer to the vehicle component. The method comprises the steps of:
  heating said heat shield to bring the thermoplastic material of the reinforcement layer in a molten state;
  placing the heated heat shield in a mold;
  bringing into the mold the thermoplastic material of the vehicle component in a molten state;
  welding the thermoplastic material of the reinforcement layer being in a molten state to the thermoplastic material of the vehicle component being in a molten state, by blow molding the vehicle component in said mold.

The term "welding" refers to the fact that the thermoplastic material of the vehicle component and the thermoplastic material of the reinforcement layer are in a molten state when they are adhered to each other. The application of pressure, which is often used throughout both the heating and cooling stages, is used to keep the parts in the proper orientation and to improve melt flow across the welding interface. The compression of melt layers encourages polymer chains entanglement between the two parts. The purpose of the heating stage is to allow intermolecular entanglement from one part to the other across the faying surface (melt mixing).

The heating step of said heat shield allows to bring the thermoplastic material of the reinforcement layer in a molten state. That allows to perform a very good adhesion between the thermoplastic material of the reinforcement layer in a molten state and the thermoplastic material of the vehicle component further brought in a molten state into the mold.

Indeed, such adhesion provides a real material continuity between the thermoplastic material of the wall and the heat shield. Thus, the link is more reliable than the existing solutions.

Also, before positioning the heat shield in the mold the heat shield may be preformed.

In another particular embodiment, as it is described in the patent application WO2014/154900 in the name of the applicant, the heat shield is placed into the mold by means of a gripper. Said gripper is intended to be moved by a robot for the positioning of the heat shield into the mold. Said gripper is equipped with means of restraint such that suction pad, and means of heating of the heat shield. Once the heat shield is placed into the mold, it is fixed by means of maintaining such that means of vacuum through the wall of the die.

According to a preferred embodiment, the step of bringing into the mold the thermoplastic material of the vehicle component consists in bringing a tubular wall portion into the mold by means of a shaping tool of an extrusion die.

The shaping tool is comprised of the extrusion die for the material to be extruded. The die includes a shaping tool which engages the extrusion as it exits from an extrusion chamber and operate to smoothly shape the extrusion to its desired contour. The shaping tool may be a pair of cutters.

In another embodiment, the step of bringing into the mold the thermoplastic material of the vehicle component consists in bringing an extruded sheet into the mold.

During the welding step, a pressure of a blowing gas is applied in order to inflate the thermoplastic material wall in a molten state against the mold. The parison in a molten state is placed against the heat shield in a molten state, maintained inside the mold. It results a reliable adhesion between the thermoplastic material of the wall and the heat shield.

In a further developed embodiment, after the blow-molding, the mold is kept at a predetermined temperature during a predetermined time period for obtaining a good adherence of the reinforcement layer to the wall of the blow-molded vehicle component.

Another advantage of the invention is that the heat shield is adhered to the wall of the vehicle component in line during the molding process of the vehicle component, either during the shaping of the sheet by blow molding process or during the post-blow molding process of the vehicle component. This allows a reduction of time of the manufacturing cycle.

The reinforcement layer may be formed by melting the thermoplastic material around/in a fiber mass, e.g. a woven fiber mat, so that a reinforcement layer is obtained having at least one surface that is weldable to the vehicle component. The reinforcement layer may be manufactured by calendaring, compression moulding, injection moulding, etc.

In a preferred embodiment the heat shielding material comprises a heat-insulating layer of a heat insulation material, said heat-insulating layer being arranged against the reinforcement layer. Preferably, the heat insulation material is a foam material. The heat-insulating layer may be arranged against the reinforcement layer using suitable glue.

In addition or alternatively, the heat shielding material may comprise a reflective layer, e.g. a metal layer, which forms an outer layer of the heat shield, said reflective layer being configured for reflecting heat radiation. Such a reflective layer may be glued against the reinforcement layer or against the heat-insulating layer, if the latter is present. Alternatively the reflective layer may be laminated together with the reinforcement layer or may be integrated on the reinforcement layer during the manufacturing process thereof, e.g. using a pulltrusion process. In a preferred embodiment the reflective layer is a thin aluminium sheet with a thickness which is lower than 0.5 mm.

In an alternative embodiment, polyethylene grafter with maleic anhydride might be used to improve the bonding with insulation material.

By coupling the reinforcement layer with a heat shielding material, a heat shield is obtained that is integrated with the vehicle component. In that way handling of the vehicle component with heat shield is easier, and vibration noises or peel-off due to aging can be avoided. The term "welded" refers to the fact that the material of the reinforcement layer is adhered to the wall of the tank in a molten state thereof so that a continuous and reliable bond is achieved. Further, by combining the reinforcement and heat shielding function, also deformations of the vehicle component at a critical location, namely close to a hot element, can be significantly reduced.

According to an embodiment, the reinforcement layer is a fiber filled reinforcement layer, and in particular a pre-impregnated fiber composite (prepreg) layer. In other words, the reinforcement layer may comprise a thermoplastic material and fibers. The fibers may be cut fibers, or woven or non-woven long or continuous fibers. Preferably, the fibers are included in the form of a woven mat of fibers, more preferably a woven mat of glass fibers. However, carbon fibers, natural fibers or polymer fibers, e.g. polyamide fibers, may also be used. The thermoplastic material is configured to be weldable to the material of the tank, and may be a polyolefin material, in particular a polyethylene material, and e.g. high-density polyethylene. To improve the compatibility between the fibers and the thermoplastic material, the surface of the fibers may be treated with a compatibilist substance such as silane and/or a reactive binder. Preferably the thermoplastic material content in the thermoplastic material is lower than 50 percent, more preferably lower than 30%. Preferably the fiber content is higher than 50 percent, more preferably higher than 70 percent. More details about suitable reinforcement layers can be found in patent application FR2 957 296-A1 in the name of the Applicant, which is included herein by reference.

Preferably the reinforcement layer has a thickness between 0.1 and 2.5 mm, more preferably between 0.5 and 1.5 mm. Preferably, the reinforcement layer has a tensile modulus, measured in accordance with the ASTM D638 test method, higher than 3000 MPa.

In a preferred embodiment the heat shielding material comprises a heat-insulating layer of a heat insulation material, said heat-insulating layer being provided against the reinforcement layer. Such a heat-insulating layer will reduce the heat that is transferred to the vehicle component. Preferably, the heat insulation material is a foam material, e.g. polyurethane foam. Such a foam material may be glued against the reinforcement layer (with cyanoacrylate glue for instance). Preferably, the heat insulation material has a thermal conductivity (K-value), which is lower than 0.06 W/mK, more preferably lower than 0.04 W/mK. For example, at 25 degrees Celsius, typically, the thermal conductivity of polyethylene is about 0.44 W/mK, the thermal conductivity of polyamide 6 is about 0.29 W/mK, and the thermal conductivity of polyurethane foam is about 0.03 W/mK. Preferably, the heat-insulation material has a tensile modulus, measured in accordance with the ASTM D638 test method, which is higher than 900 MPa. In that way, the heat-insulating layer may further contribute to the stiffness and may reduce the tendency of the vehicle component to deform. In a preferred embodiment the heat-insulating layer has a thickness between 1 and 10 mm, more preferably between 3 and 7 mm.

In a possible embodiment the heat shielding material comprises a reflective layer that forms the outer layer of the heat shield, said reflective layer being configured for reflecting heat radiation. By reflecting heat radiation, less heat is transferred to the vehicle component. Preferably, the reflective layer is a metal layer. In an exemplary embodiment the reflective layer is a thin aluminium sheet with a thickness which is lower than 0.5 mm. When a heat-insulating layer is present, the reflective layer may be adhered to the heat-insulating layer. When no heat-insulating layer is provided, the reflective layer may be adhered to the reinforcement layer. By using a reinforcement layer in combination with a reflective metal layer, the reinforcement layer can block post-molding shrinkage of the vehicle component, and ensure a correct placement of the reflective metal layer.

In an alternative embodiment the heat shielding material comprises metal particles arranged at least in an outer layer of the heat shield, such that heat is reflected at said outer layer. Such metal particles may be included in the reinforcement layer or in a separate layer on top of the reinforcement layer or on top on the heat-insulating layer, if present. A thermally reflecting (or "heat reflective") coating or paint could be applied as well.

The vehicle component may be a tank. The tank may be a fuel tank or an additive tank for a vehicle. The tank may comprise a first shell and a second shell, wherein edges of said first and second shell are mutually connected such that said first and second shell together form a container delimiting an internal volume. In such an embodiment the reinforcement layer may be welded, e.g. by overmoulding, either to the first or the second shell. The tank is made of a thermoplastic material. The term "thermoplastic material" is understood to mean any thermoplastic polymer, including thermoplastic elastomers, and blends thereof. The term "polymer" is understood to mean both homopolymers and copolymers (especially binary or ternary copolymers). Examples of such copolymers are: random copolymers, linear block copolymers, other block copolymers and graft copolymers. One polymer often employed is high-density polyethylene (HDPE). However, excellent results may also be obtained with other polyolefins, with polyamides, with thermoplastic polyesters, with polyketones, and with copolymers thereof. Also a blend of different polymers or copolymers, optionally mixed with additives, may be used. The tank may be a single layer tank or a multilayer tank comprising one or more barrier layers.

The term "fuel tank" is understood to mean a substantially impermeable tank that can store fuel under diverse and varied environmental and usage conditions. Preferably, a fuel tank also comprises a layer of a fuel-impermeable resin such as, for example, EVOH (a partially hydrolysed ethylene/vinyl acetate copolymer). Alternatively, the tank may be subjected to a surface treatment (fluorination or sulphonation) for the purpose of making it impermeable to fuel. A multilayer fuel tank comprising an EVOH layer between two HDPE layers is successfully used in the context of the invention.

The term "additive tank" is understood to mean a substantially impermeable tank that can store additive under diverse and varied environmental and usage conditions. The additive is typically an ammonia precursor solution.

The vehicle component may be a filler pipe. The reinforcement layer may then be welded to the outer wall of the filler pipe. The filler pipe is pipe used for filling a tank with fluid. Typically, filler pipes have a diameter between 20 and 60 mm, more preferably between 25 and 50 mm, and a length that is more than 15 cm.

According to a second aspect of the invention there is provided a method for manufacturing a vehicle component comprising a wall made of thermoplastic material, the method for manufacturing comprises a step of adhering a heat shield to said wall, characterized in that the step of adhering comprises the steps of a method for welding a heat shield described above.

According to a particular embodiment, the vehicle component is a fuel tank.

According to another particular embodiment, the vehicle component is a filler pipe.

The method of the invention integrates step of welding of the heat shield to the wall of the vehicle component without the need for separated welding step provided. In other words, it means that the heat shield is welded in line during the blow molding process. The blow operation is provided for shaping the sheet and for welding the heat shield to the wall of the vehicle component.

The fixation by welding of the heat shield gives the benefits stated above, by comparison with a mechanical retaining means.

In another embodiment, the heat shield is introduced in the mold to apply it against the inner wall of the mold. In this case, the heat shield is on the sheet part directed towards the outside of the vehicle component.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIG. 1 illustrates schematically a cross section of a vehicle tank with a heat shield according to an embodiment of the invention;

FIG. 2 illustrates a detailed cross section of part II of FIG. 1;

FIG. 3 illustrates a variant of the cross section of FIG. 2;

FIGS. 5-7 illustrate schematically an embodiment of the method of the invention.

FIGS. 1 and 2 illustrate a first embodiment of a vehicle tank 10, here a saddle tank, made from a thermoplastic material, e.g. HDPE, wherein a heat shield 20 is adhered to an outer wall of the tank 10, and in particular to a wall part of the recess in the bottom of the tank 10. As illustrated in FIG. 2, the heat shield 20 comprises a reinforcement layer 21, a heat-insulating layer 22 and a reflective layer 23. The reinforcement layer 21 is made from a thermoplastic material, e.g. HDPE, which is weldable to the thermoplastic material of the vehicle tank. The reinforcement layer 21 is welded to the outer wall 10. In this embodiment the heat shielding material consists of the heat-insulting layer 22 and the reflective layer 23. These layers 22, 23 are configured for decreasing the transfer of heat through the reinforcement layer 21 to the vehicle tank.

Figure 4A:
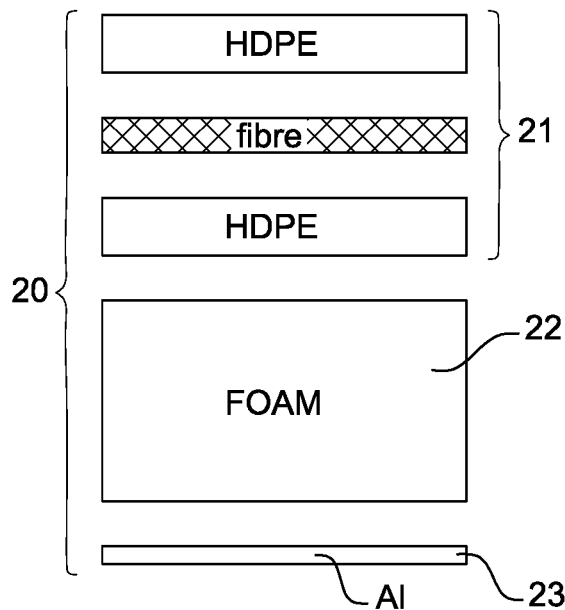
FIGS. 4A-4C illustrate the cross section of three variants of a heat shield for use in embodiments of the invention.

Preferably, the reinforcement layer 21 is a fiber filled reinforcement layer, and more in particular a pre-impregnated fibers composite layer, i.e. a so-called prepreg layer. In other words, the reinforcement layer 21 may comprise a thermoplastic material and fibers. The fibers may be cut fibers, or woven or non-woven long or continuous fibers. Preferably, the fibers are included in the form of a woven mat of fibers, more preferably a woven mat of glass fibers. Preferably the reinforcement layer 21 has a thickness t2 between 0.1 and 2.5 mm, more preferably between 0.5 and 1.5 mm. Typically, the wall of the tank 10 has a thickness t1 between 2 and 10 mm, preferably between 3 and 8 mm.

The heat-insulating layer 22 is arranged against the reinforcement layer 21. Such a heat-insulating layer 22 will reduce the heat that is transferred to the tank 10. Preferably, the heat-insulating layer 22 is made of a foam material, e.g. polyurethane foam. Such a foam material may be glued against the reinforcement layer 21. Preferably, the foam material has a thermal conductivity (K-value), which is lower than 0.06 W/mK, more preferably lower than 0.04 W/mK. In a preferred embodiment the heat-insulating layer 22 has a thickness t3 between 1 and 10 mm, more preferably between 3 and 7 mm.

The reflective layer 23 forms the outer layer of the heat shield 20, and is configured for reflecting heat radiation. By reflecting heat radiation, less heat is transferred to the vehicle tank. Preferably, the reflective layer 23 is a metal layer. In an exemplary embodiment the reflective layer 23 is a thin aluminium sheet with a thickness t4 which is lower than 0.5 mm. The reflective layer 23 may be adhered, e.g. glued, to the heat-insulating layer. When no heat-insulating layer 22 is provided, the reflective layer 23 may be adhered to the reinforcement layer 21, see the variant of FIG. 3.

Figure 4B:
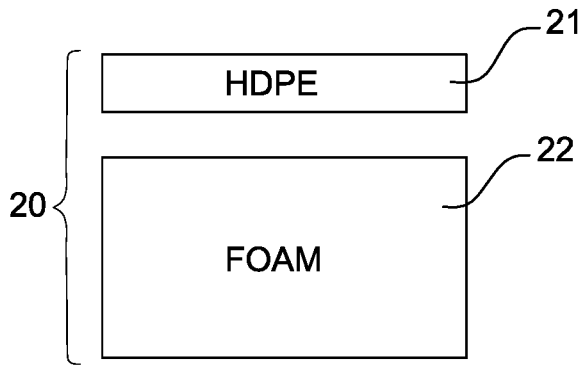
Figure 4C:
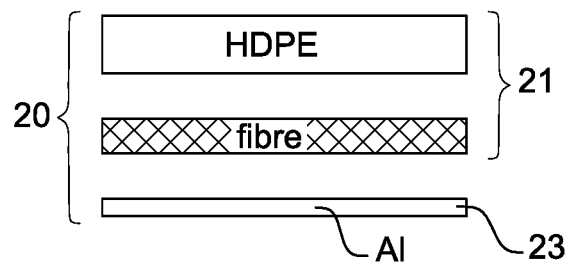

FIGS. 4A-4C illustrate three exemplary embodiments of a heat shield for use in a vehicle component of the invention. In the embodiment of FIG. 4A the reinforcement layer 21 is formed, e.g. compression molded, by including a fiber mat between two HDPE layers. A foam layer 22 is arranged, e.g. glued, against the reinforcement layer 21. A reflective outer layer 23 in the form of a thin aluminium sheet is fixed, e.g. glued against the foam material. Such a heat shield may be welded with its HDPE outer layer to the outer wall of a vehicle component such as a tank or a filler pipe. In the embodiment of FIG. 4B, a HDPE layer that does not contain fibers forms the reinforcement layer 21. A foam layer 22 is arranged, e.g. glued, against the reinforcement layer 21. No reflective outer layer is provided. In the embodiment of FIG. 4C, the reinforcement layer 21 is formed by arranging a fiber mat against/in a HDPE layer. A reflective outer layer 23 in the form of a thin aluminium sheet is fixed, e.g. glued against the fibre material.

Figure 7:
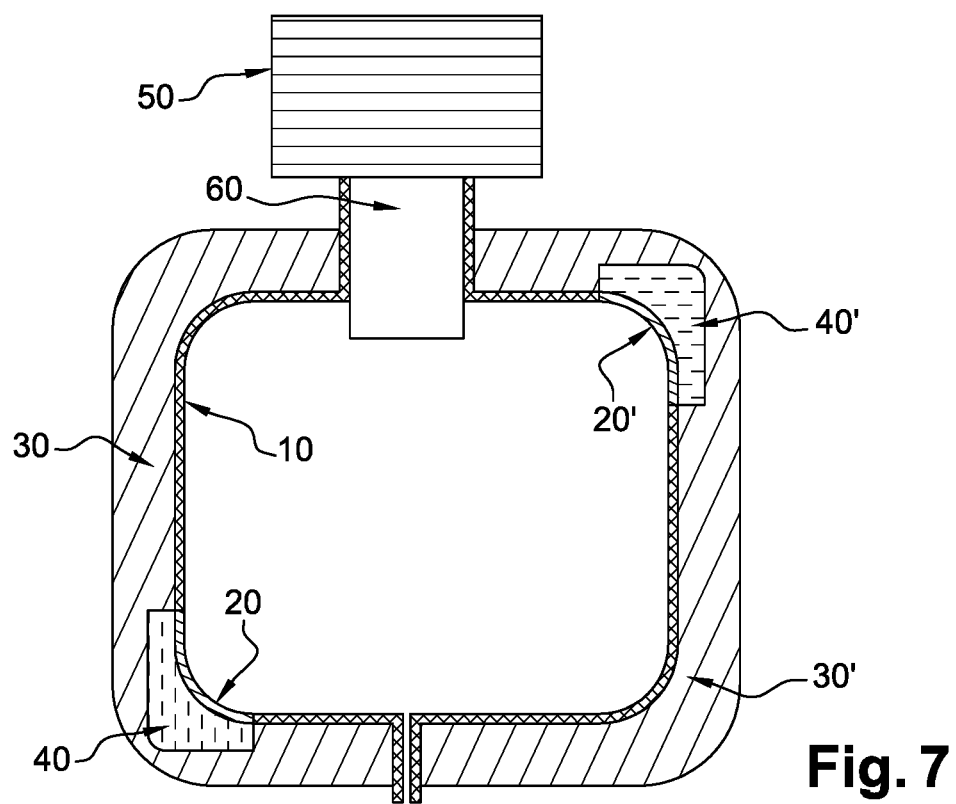

FIGS. 5-7 illustrate an embodiment of the method of the invention for blow-molding a vehicle tank, from a thermoplastic material. In this embodiment the heat shield is overmolded on the tank as follows. The method comprises adhering a heat shield 20, 20' to a wall of the vehicle tank. In a first step one or more heat shields 20, 20' are placed in a mold 30, 30'. Afterwards the tank is blow-molded from a tubular wall portion 10, which is brought into the mold by means of a shaping tool 60 of an extrusion die 50. The temperature of the heat shields 20, 20' and the mold 30, 30' are such that the reinforcement layer is welded to the thermoplastic material 10 of the tank. Optionally, there may be provided additional heating means 40, 40' in the mold 30, 30' for heating the heat-shields 20, 20'.

In an alternative embodiment, the Twin Sheet Blow Molding Process (TSBM), as described in earlier patent applications WO2007/000454A1, WO2011/110480A1 in the name of the applicant, can be advantageously used. In this case, the shield is adhered onto the extruded sheet instead of to the tubular wall portion.

The heat shields 20, 20' comprise a reinforcement layer made from a thermoplastic material that is welded to the thermoplastic material of the tank, and a heat shielding material which differs from said thermoplastic material of said layer and which is configured for decreasing the transfer of heat through the reinforcement layer to the tank. In a possible embodiment, after the blow-molding, the mold 30, 30' is kept at a predetermined temperature during a predetermined time period for obtaining a good adherence of the reinforcement layer to the wall 10 of the blow-molded tank. In a possible embodiment, before placing the heat shield 20, 20' in the mold 30, 30', the heat shield 20, 20' is heated to bring the thermoplastic material of the reinforcement layer thereof in a molten state. Also, the heat shield 20, 20' may be preformed before positioning the heat shield 20, 20' in the mold 30, 30'.

According to an alternative non-illustrated embodiment the adhering of the heat shield to a vehicle tank or filler pipe comprises welding the heat shield against an outer wall of an already molded vehicle tank or filler pipe.

In a preferred embodiment the heat shields 20, 20' comprise a heat-insulating layer of a heat insulation material, said heat-insulating layer being arranged against the reinforcement layer. Preferably, the heat insulation material is a foam material. In addition or alternatively, the heat shields 20, 20' may comprise a reflective layer, e.g. a metal layer, which forms an outer layer of the heat shield, said reflective layer being configured for reflecting heat radiation. Such a reflective layer may be glued against the reinforcement layer or against the insulation layer, if the latter is present. Alternatively the reflective layer may be laminated together with the reinforcement layer. In a preferred embodiment the reflective layer is a thin aluminium sheet.

The above-illustrated embodiments relate to tanks, but a skilled person will understand that the technical features and insights of the invention may be equally applied in filler pipes.

Whilst the principles of the invention have been set out above in connection with specific embodiments, it is to be understood that this description is merely made by way of example and not as a limitation of the scope of protection, which is determined by the appended claims.

The invention claimed is:

1. A method for welding a heat shield during manufacturing of a vehicle tank, or a filler pipe, the tank or the pipe being made from a thermoplastic material, the heat shield including: a reinforcement layer made from a thermoplastic material which is weldable to the thermoplastic material of the vehicle tank or filler pipe; and a heat shielding material which differs from the thermoplastic material of the reinforcement layer and which is configured to decrease transfer of heat through the reinforcement layer to the vehicle tank or filler pipe; the method comprising:
   heating the heat shield to bring the thermoplastic material of the reinforcement layer in a molten state;
   placing the heated heat shield in a mold;
   bringing into the mold the thermoplastic material of the vehicle tank or filler pipe in a molten state;
   welding the thermoplastic material of the reinforcement layer being in a molten state to the thermoplastic material of the vehicle tank or filler pipe being in a molten state, by blow molding the vehicle tank or filler pipe in the mold.

2. A method of claim 1, wherein the bringing into the mold the thermoplastic material of the vehicle tank or filler pipe brings a tubular wall portion into the mold by a shaping tool of an extrusion die.

3. A method of claim 1, wherein the bringing into the mold the thermoplastic material of the vehicle tank or filler pipe brings an extruded sheet into the mold.

4. A method of claim 1, wherein the heat shield is preformed before placing the heat shield in the mold.

5. A method of claim 1, wherein the heat shielding material comprises a heat-insulating layer of a heat insulation material, the heat-insulating layer being provided against the layer of thermoplastic material of the vehicle tank or filler pipe.

6. A method of claim 1, wherein the heat shielding material comprises a reflective layer that forms an outer layer of the heat shield, the reflective layer configured to reflect heat radiation.

7. A method according to claim 6, wherein the reflective layer is adhered to the heat-insulating layer.

8. A method according to claim 6, wherein the reflective layer is adhered to the reinforcement layer.

9. A method for manufacturing a vehicle tank or filler pipe including a wall made of thermoplastic material, the method for manufacturing comprising:
   adhering a heat shield to the wall, the adhering comprises a method for welding a heat shield according to claim 1.

10. A method of claim 1, wherein after said blow-molding, the mold is maintained at a predetermined temperature during a predetermined time period to provide a good adherence of the reinforcement layer to the wall of the tank or filler pipe.

11. A method of claim 1, wherein said heat shield is heated during said welding by a heating means in said mold.

12. A method of claim 1, wherein the heat shielding material comprising a heat-insulating layer arranged against the reinforcement layer.

* * * * *